(No Model.)

J. J. VARLEY.
SEATING FOR BOTTLE STOPPERS.

No. 325,776. Patented Sept. 8, 1885.

Witnesses
J. V. Kalb
A. C. Rawlings

Inventor:
John James Varley
by John J. Halsted & Son
his Attys.

UNITED STATES PATENT OFFICE.

JOHN JAMES VARLEY, OF PHŒNIX VILLAS, MERTON, COUNTY OF SURREY, ENGLAND.

SEATING FOR BOTTLE-STOPPERS.

SPECIFICATION forming part of Letters Patent No. 325,776, dated September 8, 1885.

Application filed June 16, 1885. (No model.) Patented in England November 22, 1884, No. 15,424.

*To all whom it may concern:*

Be it known that I, JOHN JAMES VARLEY, a subject of the Queen of Great Britain, residing at Phœnix Villas, Merton, in the county of Surrey, England, engineer, have invented new and useful Improvements in Seatings for Stoppers for Bottles Containing Aerated or Gaseous Liquids, of which the following is a specification.

This invention relates to improvements in that class of seatings or rings which are placed in the necks of bottles having internal stoppers for the purpose of forming a gas-tight joint for the stoppers of such bottles, whereby the liability of the stoppers being forced out by the pressure of the gas within the bottle is prevented, and the seating or ring is firmly fixed in its place, so that it cannot be displaced or blown out.

In carrying out my invention a ring or core of hemp, flax, silk, cotton, or other suitable fibrous material is coated or covered with soft india-rubber, and the same is formed of the required shape, so that it can be fitted into the usual groove made in the neck of the bottle.

In order to enable my invention to be fully understood and carried into practice, I will proceed to describe, by reference to the accompanying drawings, the method I find most suitable for manufacturing seatings or rings of vulcanized india-rubber with a core of suitable material—such as flax.

Figure 2:
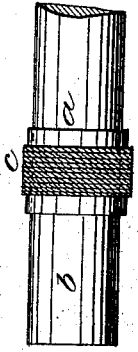
Figure 1:
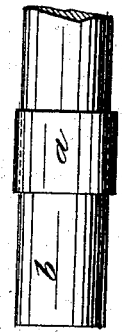
Figure 3:
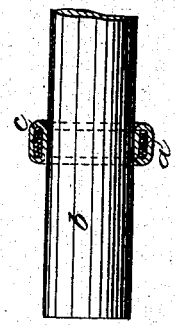

From sheet rubber dough of the required thickness, I cut in any suitable manner a number of strips or pieces, each of the proper size to form a ring or seating. One of these strips or pieces $a$ is then laid around a rod or mandrel—such as $b$—as shown in Figure 1 of the drawings. The ends of the soft rubber dough are joined by being pressed together, so as to form a short tube. Around the periphery of this short tube $a$, I then wind hempen string or other suitable fiber, $c$, as shown in Fig. 2 of the drawings, to form a core, the said hempen string or other fiber being coated with india-rubber in solution, so as to insure its adhering to the rubber tube $a$. The ends of the india-rubber tube $a$ are then turned over the hempen-string core $c$, and the edges joined and fastened together, as shown in the partly-sectional view at Fig. 3. The ring of rubber dough thus formed is then removed from the rod or mandrel and placed in a die and finished or cured in the manner usually practiced in manufacturing vulcanized india-rubber; or the use of a die can be dispensed with and the ring be cured in chalk or in other well-known manner.

Figure 4:
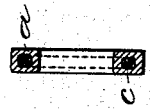
Figure 5:
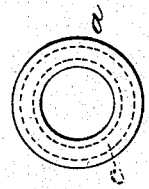

Fig. 4 is a section, and Fig. 5 a plan, of the finished seating or ring.

I thus obtain elastic rings or seatings suitable for insertion in the grooves usually formed in the necks of bottles closed with internal stoppers. Such rings or seatings are very flexible, and can be easily inserted into the said grooves; but, by reason of the core with which the rings or seatings are provided not being elastic, their diameter cannot be increased, thereby preventing the seatings being displaced and the stoppers (which are placed in the bottles before the seatings) from being blown out by the internal pressure within the bottle.

Having now particularly described and ascertained the nature of my invention, and in what manner the same is to be performed, I declare that what I claim is—

1. A seating for insertion in grooves in the necks of bottles having internal stoppers, made of vulcanized india-rubber with a core of hemp or other like material, substantially as and for the purposes hereinbefore described.

2. A seating for insertion in a groove in the neck of a bottle in which an internal stopper is used, constituted, as described, of a short rubber tube, $a$, wound in part with fibrous material to form a core, and having the ends of the tube turned over upon such fibrous material and joined together to inclose such core, all as set forth.

J. J. VARLEY.

Witnesses:
G. F. REDFERN,
ALFRED ROWLAND.